UNITED STATES PATENT OFFICE.

J. PETER EISENHUT, OF MONROE, MICHIGAN.

IMPROVED MEDICAL COMPOUND.

Specification forming part of Letters Patent No. 55,474, dated June 12, 1866.

*To all whom it may concern:*

Be it known that I, J. PETER EISENHUT, of Monroe, in the county of Monroe and State of Michigan, have invented a new and Improved Medical Compound; and I do hereby declare that the following is a full, clear, and exact description thereof, which will enable others skilled in the art to fully understand and make use of the same.

This invention relates to a balsam which is an excellent remedy for colic, pains in the limbs and stones, for all kinds of colds, coughs, fever, weak eyes, seasickness, frost, and fresh wounds, being applicable both externally and internally. It also cures the buzzing of the ears in a short time.

My balsam is composed of olive-oil, flowers of sulphur, angelica, sap of elder-blossoms and of linden-blossoms, spirits of turpentine, and saffron, and these ingredients are mixed together in about the following proportions: olive-oil, one gallon; flowers of sulphur, one-half pound; angelica, one ounce; sap of elder-blossoms, one ounce; sap of linden-blossoms, one ounce; spirits of turpentine, one quart; saffron, one-sixth ounce.

At first I boil the olive-oil for about one hour; then I add the flowers of sulphur and boil again for a short time. Finally I mix with it the remaining ingredients and clean the mixture well, and then I boil the whole for a short time. When cold it is ready for use.

For colic, pains of the limbs, cold, &c., it may be taken internally, being mixed with a small quantity of milk or water; but for wounds, frozen limbs, &c., it is applied externally by rubbing the afflicted parts, or it may be applied by wetting a small piece of cotton, and in this manner it is also used against buzzing of the ears.

What I claim as new, and desire to secure by Letters Patent, is—

A medical compound made of the ingredients herein specified, and mixed together, substantially as and for the purposes set forth.

J. PETER EISENHUT.

Witnesses:
GERY F. SCHMIDT,
GEORGE LEONARD REISIG.